(12) United States Patent
Haginoya

(10) Patent No.: US 11,047,278 B2
(45) Date of Patent: Jun. 29, 2021

(54) CATALYST WARNING APPARATUS

(71) Applicant: SUBARU CORPORATION, Tokyo (JP)

(72) Inventor: Satoshi Haginoya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/735,288

(22) Filed: Jan. 6, 2020

(65) Prior Publication Data

US 2020/0300139 A1 Sep. 24, 2020

(30) Foreign Application Priority Data

Mar. 19, 2019 (JP) .............................. JP2019-051899

(51) Int. Cl.

| | |
|---|---|
| *F01N 3/08* | (2006.01) |
| *F01N 13/00* | (2010.01) |
| *F01N 13/02* | (2010.01) |
| *F02D 41/02* | (2006.01) |
| *F01N 3/30* | (2006.01) |
| *F01N 3/36* | (2006.01) |
| *F01N 3/10* | (2006.01) |
| *F01N 3/20* | (2006.01) |

(52) U.S. Cl.
CPC ............. *F01N 3/0842* (2013.01); *F01N 3/30* (2013.01); *F01N 3/36* (2013.01); *F01N 13/009* (2014.06); *F01N 13/02* (2013.01); *F02D 41/024* (2013.01); *F01N 3/101* (2013.01); *F01N 3/2066* (2013.01); *F01N 2610/03* (2013.01); *F01N 2610/085* (2013.01); *F01N 2900/0422* (2013.01); *F02D 2200/0802* (2013.01)

(58) Field of Classification Search
CPC ...... F01N 13/009; F01N 13/02; F01N 3/0842; F01N 3/2033; F01N 3/22; F01N 3/30; F01N 3/36; F01N 9/00; F01N 2260/14; F01N 2270/00; F01N 2290/00; F01N 2430/06; F01N 2430/085; F01N 2610/03; F01N 2610/085; F01N 2900/0422; F01N 2900/08; F01N 2900/10; F01N 2900/1804; F01N 2900/1821; F01N 3/101; F01N 3/2066; F02D 41/024; F02D 2200/0802

See application file for complete search history.

(56) References Cited

U.S. PATENT DOCUMENTS 6,122,909 A * 9/2000 Murphy ................ F01N 13/009 60/286
2017/0074149 A1 * 3/2017 Ge .......................... F01N 3/323

FOREIGN PATENT DOCUMENTS

| JP | 2006-194103 A | 7/2006 |
| JP | 2016176404 A | * 10/2016 |

OTHER PUBLICATIONS

Machine Translation of JP2016176404 a (Nakada) (Year: 2016).*

* cited by examiner

*Primary Examiner* — Brandon D Lee
(74) *Attorney, Agent, or Firm* — McDermott Will & Emery LLP

(57) ABSTRACT

A catalyst warming apparatus includes an air blower, a fuel feeder, and an air blowing controller. The air blower is disposed between an engine and a purification catalyst in an exhaust pipe communicating with the engine and is configured to blow air toward the purification catalyst. The fuel feeder is configured to cause the purification catalyst to retain fuel. The air blowing controller is configured to start driving the air blower at a predetermined start timing before a start of the engine.

3 Claims, 4 Drawing Sheets

US 11,047,278 B2

CATALYST WARNING APPARATUS

CROSS-REFERENCE TO RELATED APPLICATIONS

The present application claims priority from Japanese Patent Application No. 2019-051899 filed on Mar. 19, 2019, the entire contents of which are hereby incorporated by reference.

BACKGROUND

The disclosure relates to a catalyst warming apparatus.

Exhaust gas from engines contains restricted substances such as hydrocarbon (HC), carbon monoxide (CO), and nitrogen oxide ($NO_x$). Exhaust pipes of vehicles are provided with catalysts for purification of HC, CO, and $NO_x$ (for example, Japanese Unexamined Patent Application Publication (JP-A) No. 2006-194103).

SUMMARY

An aspect of the disclosure provides a catalyst warming apparatus including an air blower, a fuel feeder, and an air blowing controller. The air blower is disposed between an engine and a purification catalyst in an exhaust pipe communicating with the engine and configured to blow air toward the purification catalyst. The fuel feeder is configured to cause the purification catalyst to retain fuel. The air blower at a predetermined start timing before a start of the engine.

An aspect of the disclosure provides a catalyst warming apparatus including an air blower, and circuitry. The air blower is disposed between an engine and a purification catalyst in an exhaust pipe communicating with the engine and configured to blow air toward the purification catalyst. The circuitry is configured to cause the purification catalyst to retain fuel. The circuitry is configured to start driving the air blower at a predetermined start timing before a start of the engine.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The active temperature of a purification catalyst (for example, 200° C. or higher) is higher than normal temperature. Immediately after the start of the engine, the restricted substances may be exhausted from the vehicle because the temperature of the purification catalyst does not reach the active temperature.

It is desirable to provide a catalyst warming apparatus capable of warming the purification catalyst before the start of the engine.

Engine System 100

Figure 1:
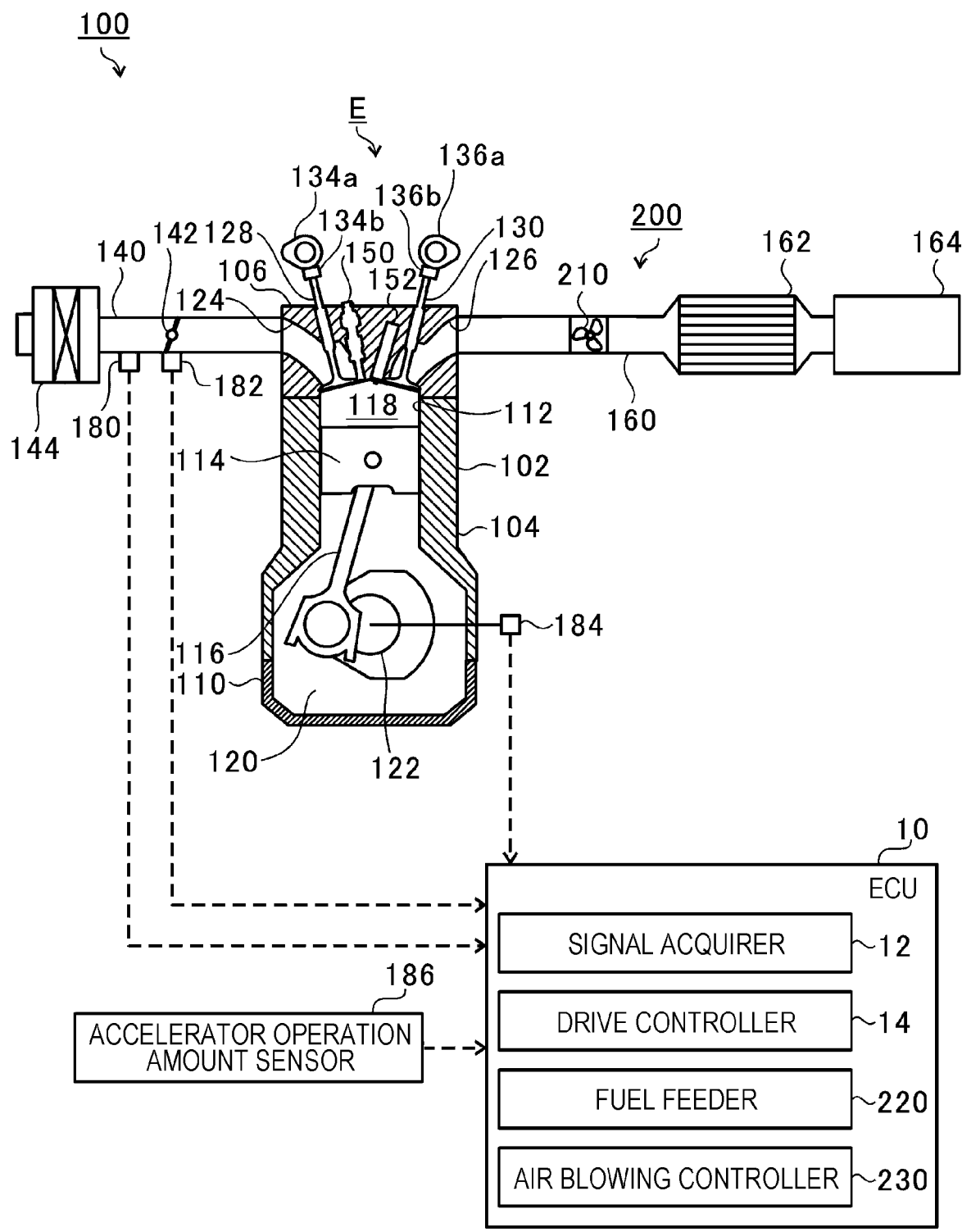
FIG. 1 is an explanatory diagram of an engine system according to an embodiment.

FIG. 1 is an explanatory diagram of an engine system 100 according to this embodiment. In FIG. 1, signal flows are represented by dashed arrows.

As illustrated in FIG. 1, the engine system 100 to be mounted on a vehicle includes an engine control unit (ECU) 10. The ECU 10 is a microcomputer including a central processing unit (CPU), a read-only memory (ROM) that stores programs and the like, and a random-access memory (RAM) serving as a working area. The ECU 10 controls an overall engine E. The following description is directed to details of structures and processing operations relating to this embodiment. Description is omitted for structures and processing operations that do not relate to this embodiment.

The engine E of the engine system 100 includes a cylinder block 102, a crankcase 104, a cylinder head 106, and an oil pan 110. The crankcase 104 is permanently joined to the cylinder block 102. The cylinder head 106 is joined to the cylinder block 102 opposite the crankcase 104. The oil pan 110 is joined to the crankcase 104 opposite the cylinder block 102.

The cylinder block 102 has a plurality of cylinder bores 112. In each of the plurality of cylinder bores 112, a piston 114 is slidably supported by a connecting rod 116. The engine E has a combustion chamber 118 that is a space surrounded by the cylinder bore 112, the cylinder head 106, and the top surface of the piston 114.

The engine E has a crank chamber 120 that is a space surrounded by the crankcase 104 and the oil pan 110. In the crank chamber 120, a crankshaft 122 is rotatably supported and the pistons 114 are coupled to the crankshaft 122 via the connecting rods 116.

The cylinder head 106 has an intake port 124 and an exhaust port 126 communicating with the combustion chamber 118. The distal end (valve head) of an intake valve 128 is located between the intake port 124 and the combustion chamber 118. The distal end (valve head) of an exhaust valve 130 is located between the exhaust port 126 and the combustion chamber 118.

An intake cam 134a, a rocker arm 134b, an exhaust cam 136a, and a rocker arm 136b are provided in a space surrounded by the cylinder head 106 and a head cover (not illustrated). The intake cam 134a fixed to an intake cam shaft abuts against the intake valve 128 via the rocker arm 134b. The intake valve 128 moves in its axial direction along with rotation of the intake cam shaft to open or close a space between the intake port 124 and the combustion chamber 118. The exhaust cam 136a fixed to an exhaust cam shaft abuts against the exhaust valve 130 via the rocker arm 136b. The exhaust valve 130 moves in its axial direction along with rotation of the exhaust cam shaft to open or close a space between the exhaust port 126 and the combustion chamber 118.

An intake pipe 140 including an intake manifold communicates with an upstream side of the intake port 124. A throttle valve 142 and an air cleaner 144 are provided in the intake pipe 140. The air cleaner 144 is located on an upstream side of the throttle valve 142. The throttle valve 142 is opened or closed by an actuator depending on the operation amount of an accelerator (not illustrated). Air cleaned by the air cleaner 144 is taken into the combustion chamber 118 through the intake pipe 140 and the intake port 124.

In the cylinder head 106, an injector 150 is provided such that a fuel injection port is open to the combustion chamber 118. In one example, the injector 150 may serve as a fuel injector. In the cylinder head 106, a spark plug 152 is provided such that its distal end is located in the combustion chamber 118. Fuel injected into the combustion chamber 118 from the injector 150 is mixed with air supplied into the combustion chamber 118 through the intake port 124 to become an air-fuel mixture. The spark plug 152 is turned ON at a predetermined timing to burn the air-fuel mixture produced in the combustion chamber 118. The burning causes the piston 114 to reciprocate and the reciprocation is converted into rotation of the crankshaft 122 through the connecting rod 116.

An exhaust pipe 160 including an exhaust manifold communicates with a downstream side of the exhaust port 126. A purification catalyst 162 is provided in the exhaust pipe 160. Examples of the purification catalyst 162 include a three-way catalyst. The three-way catalyst contains catalytic components such as platinum (Pt), palladium (Pd), and rhodium (Rh). The purification catalyst 162 purifies exhaust gas from the exhaust port 126. For example, the purification catalyst 162 removes hydrocarbon (HC), carbon monoxide (CO), and nitrogen oxide ($NO_x$) in the exhaust gas (hydrocarbon, carbon monoxide, and nitrogen oxide may hereinafter be referred to collectively as "restricted substances"). The exhaust gas purified by the purification catalyst 162 is discharged to the outside through a muffler 164.

The engine system 100 includes an intake air amount sensor 180, a throttle opening degree sensor 182, a crank angle sensor 184, and an accelerator operation amount sensor 186.

The intake air amount sensor 180 detects the amount of air taken into the engine E. The throttle opening degree sensor 182 detects the opening degree of the throttle valve 142. The crank angle sensor 184 detects the crank angle of the crankshaft 122. The accelerator operation amount sensor 186 detects the operation amount of the accelerator (not illustrated).

The intake air amount sensor 180, the throttle opening degree sensor 182, the crank angle sensor 184, and the accelerator operation amount sensor 186 are coupled to the ECU 10 and output signals indicating detection values to the ECU 10.

The ECU 10 controls the engine E by acquiring the signals output from the intake air amount sensor 180, the throttle opening degree sensor 182, the crank angle sensor 184, and the accelerator operation amount sensor 186. The ECU 10 functions as a signal acquirer 12 and a drive controller 14 to control the engine E.

The signal acquirer 12 acquires signals indicating values detected by the intake air amount sensor 180, the throttle opening degree sensor 182, the crank angle sensor 184, and the accelerator operation amount sensor 186. The signal acquirer derives the rotational speed of the engine E (rotational speed of the crankshaft) based on the signal acquired from the crank angle sensor 184 and indicating the crank angle. The signal acquirer 12 derives a load of the engine E (engine load) based on the signal acquired from the intake air amount sensor 180 and indicating the intake air amount. Various existing technologies may be employed as a technology for determining the engine load based on the intake air amount and description thereof is therefore omitted herein.

The drive controller 14 controls the throttle valve actuator (not illustrated), the injector 150, and the spark plug 152 based on the signals acquired by the signal acquirer 12.

If the engine E is driven and the temperature of the exhaust gas is equal to or higher than the active temperature of the purification catalyst 162, the purification catalyst 162 removes the restricted substances in the exhaust gas. Immediately after the start of the engine E, the temperature of the exhaust gas is lower than the active temperature. Therefore, the temperature of the purification catalyst 162 does not reach the active temperature for a certain period. In this period, the efficiency of removal of the restricted substances by the purification catalyst 162 decreases.

The engine system 100 of this embodiment includes a catalyst warming apparatus 200 that warms the purification catalyst 162 before the start of the engine E. The catalyst warming apparatus 200 is described below.

[Catalyst Warming Apparatus 200]

As illustrated in FIG. 1, the catalyst warming apparatus 200 includes an air blower 210, a fuel feeder 220, and an air blowing controller 230.

The air blower 210 is provided between the engine E (exhaust port 126) and the purification catalyst 162 in the exhaust pipe 160 and can blow air toward the purification catalyst 162. Examples of the air blower 210 include a fan. In this embodiment, the ECU 10 functions as the fuel feeder 220 and the air blowing controller 230 of the catalyst warming apparatus 200.

In one combustion cycle at the time of stopping the engine E (immediately before the engine E is stopped), the fuel feeder 220 controls the injector 150 to execute main injection and post-injection. The main injection is fuel injection executed immediately before the piston 114 reaches its top dead center to contribute mainly to power of the engine E. The post-injection is fuel injection executed after the execution of the main injection. For example, the post-injection is executed when or immediately before the exhaust valve 130 is opened. Fuel injected by the post-injection is discharged in an unburned (or incompletely burned) state from the engine E to the exhaust pipe 160 together with the exhaust gas and is retained by the purification catalyst 162.

At the time of stopping the engine E, the air blowing controller 230 rotates the intake cam shaft and the exhaust cam shaft so that the intake valve 128 and the exhaust valve 130 move and thus the intake port 124 and the exhaust port 126 are opened. At the time of stopping the engine E, the air blowing controller 230 drives the actuator so that the throttle valve 142 is opened.

The air blowing controller 230 starts driving the air blower 210 at a predetermined start timing before the start of the engine E. Examples of the start timing include a timing of detection of unlocking of a driver-side door of the vehicle, a timing of detection of a predetermined weight (weight indicating that a person has sat down a driver's seat of the vehicle) by a weight sensor at the driver's seat, a timing of detection of a person at the driver's seat by a camera installed in the vehicle, and a timing of detection of a smart key within a predetermined range around the vehicle. The ECU may learn the time of start of the engine E every day, derive an expected time of start of the engine E, and set the start timing earlier than the expected time by a predetermined period (for example, 10 minutes).

The air blowing controller 230 stops the air blower 210 at a predetermined end timing after the start of driving of the air blower 210. Examples of the end timing include a timing of the start of the engine E (for example, a timing of energization of a starter (not illustrated)), a timing of detection of locking of the driver-side door of the vehicle, and a timing of an elapse of a predetermined period from the start of driving of the air blower 210.

[Catalyst Warming Method]

Figure 2:
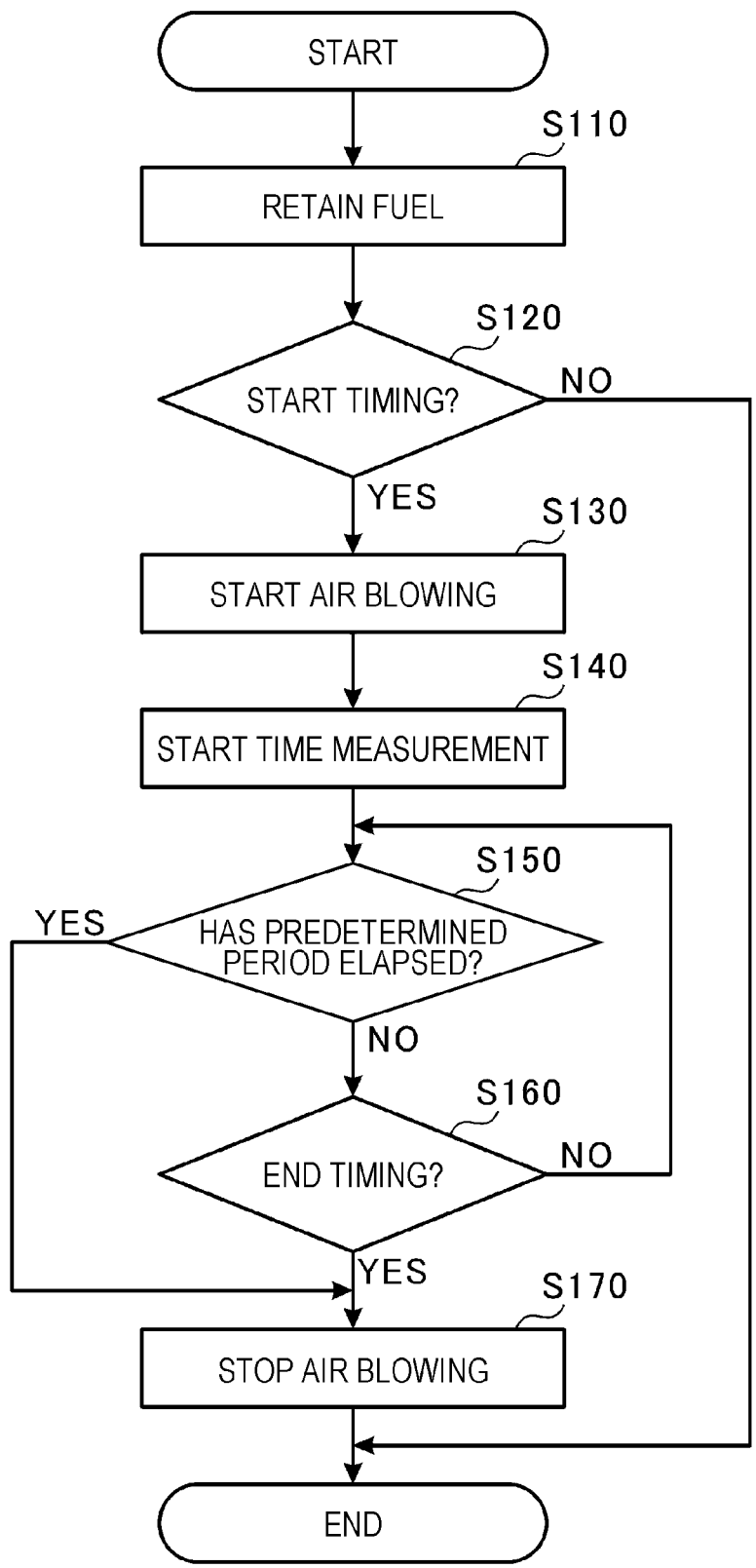
FIG. 2 is a flowchart of processing of a catalyst warming method of the embodiment.

Next, description is made of a catalyst warming method that uses the catalyst warming apparatus 200. FIG. 2 is a flowchart of processing of the catalyst warming method of this embodiment. As illustrated in FIG. 2, the catalyst warming method includes fuel retention processing S110, start determination processing S120, air blowing start processing S130, time measurement start processing S140, time elapse determination processing S150, end determination processing S160, and air blowing stop processing S170. Each processing is described below.

[Fuel Retention Processing S110]

In one combustion cycle at the time of stopping the engine E, the fuel feeder 220 controls the injector 150 to execute at least the post-injection. Fuel injected by the post-injection is discharged in an unburned state from the engine E to the exhaust pipe 160 together with the exhaust gas and is retained by the purification catalyst 162.

At the time of stopping the engine E, the air blowing controller 230 opens the throttle valve 142, the intake port 124, and the exhaust port 126.

[Start Determination Processing S120]

The air blowing controller 230 determines whether the start timing before the start of the engine E is reached. If the air blowing controller 230 determines that the start timing is reached (YES in S120), the processing proceeds to the air blowing start processing S130. If the air blowing controller 230 determines that the start timing is not reached (NO in S120), the catalyst warming method is terminated.

[Air Blowing Start Processing S130]

The air blowing controller 230 starts driving the air blower 210. Thus, air is introduced to the purification catalyst 162 through the intake pipe 140, the intake port 124, the combustion chamber 118, the exhaust port 126, and the exhaust pipe 160.

[Time Measurement Start Processing S140]

The air blowing controller 230 starts time measurement.

[Time Elapse Determination Processing S150]

The air blowing controller 230 determines whether a predetermined period (for example, 10 minutes) has elapsed from the start of time measurement in the time measurement start processing S140. If the air blowing controller 230 determines that the predetermined period has elapsed (YES in S150), the processing proceeds to the air blowing stop processing S170. If the air blowing controller 230 determines that the predetermined period has not elapsed (NO in S150), the processing proceeds to the end determination processing S160.

[End Determination Processing S160]

The air blowing controller 230 determines whether the end timing is reached. If the air blowing controller 230 determines that the end timing is reached (YES in S160), the processing proceeds to the air blowing stop processing S170. If the air blowing controller 230 determines that the end timing is not reached (NO in S160), the processing returns to the time elapse determination processing S150.

[Air Blowing Stop Processing S170]

The air blowing controller 230 stops the air blower 210. As described above, the catalyst warming apparatus 200 of this embodiment causes the purification catalyst 162 to retain fuel at the time of stopping the engine E and blows air toward the purification catalyst 162 at the predetermined start timing before the start of the engine E. Therefore, the catalyst warming apparatus 200 can advance an oxidation reaction (exothermic reaction) between fuel and oxygen (air) on the purification catalyst 162 before the start of the engine E. The catalyst warming apparatus 200 can heat (warm) the purification catalyst 162 before the start of the engine E by heat generated through the oxidation reaction. Thus, the catalyst warming apparatus 200 can cause the purification catalyst 162 to have a temperature equal to or higher than the active temperature immediately after the start of the engine E. Alternatively, the catalyst warming apparatus 200 can shorten the period that elapses before the temperature of the purification catalyst 162 reaches the active temperature. Accordingly, the catalyst warming apparatus 200 can reduce the occurrence of a case in which the restricted substances are exhausted from the vehicle after the start of the engine E.

First Modified Example

Figure 3:
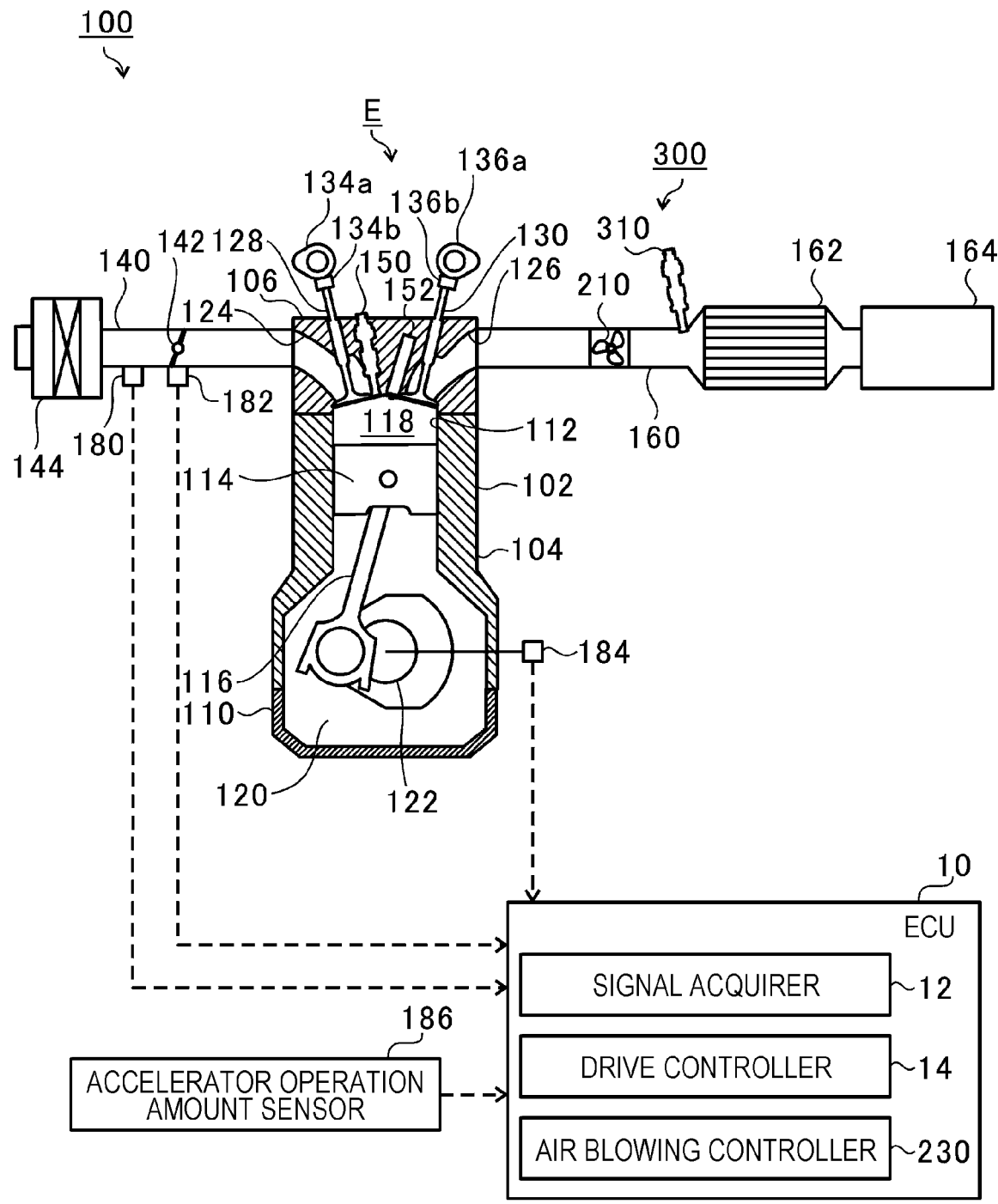
FIG. 3 is an explanatory diagram of a catalyst warming apparatus according to a first modified example.

FIG. 3 is an explanatory diagram of a catalyst warming apparatus 300 according to a first modified example. As illustrated in FIG. 3, the catalyst warming apparatus 300 includes the air blower 210, the air blowing controller 230, and a fuel feeder 310. Constituent elements equivalent to those of the catalyst warming apparatus 200 are represented by the same reference symbols to omit description thereof.

The fuel feeder 310 feeds fuel between the air blower 210 and the purification catalyst 162 in the exhaust pipe 160. For example, the fuel feeder 310 feeds fuel at the time of stopping the engine E, at the start timing, or after the driving of the air blower 210. Thus, the fuel feeder 310 can cause the purification catalyst 162 to retain fuel.

As described above, the catalyst warming apparatus 300 can warm the purification catalyst 162 before the start of the engine E by heat generated through the oxidation reaction.

Second Modified Example

Figure 4:
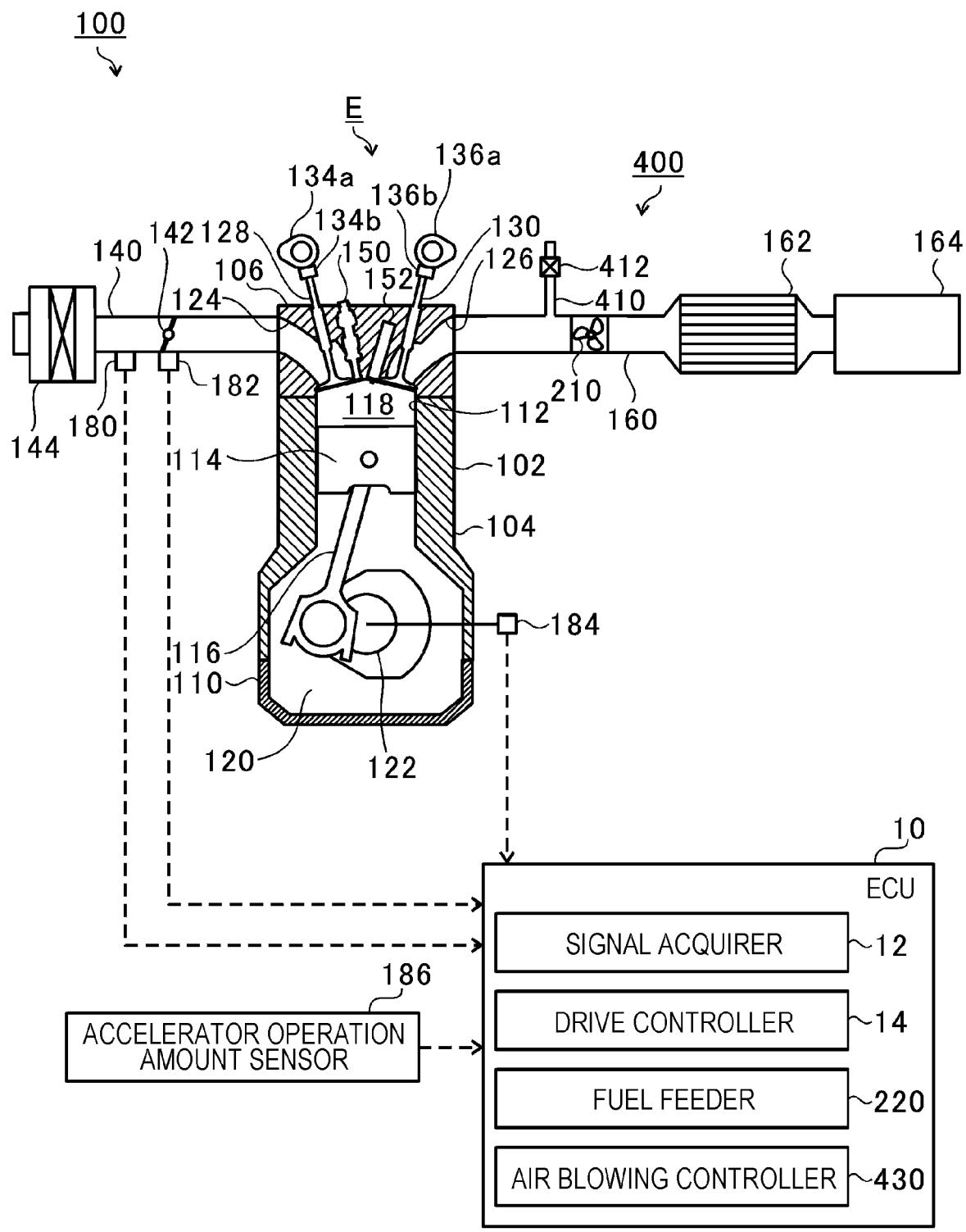
FIG. 4 is an explanatory diagram of a catalyst warming apparatus according to a second modified example.

FIG. 4 is an explanatory diagram of a catalyst warming apparatus 400 according to a second modified example. As illustrated in FIG. 4, the catalyst warming apparatus 400 includes the air blower 210, the fuel feeder 220, a branch pipe 410, an on-off valve 412, and an air blowing controller 430. Constituent elements equivalent to those of the catalyst warming apparatus 200 are represented by the same reference symbols to omit description thereof.

The branch pipe 410 branches from a part of the exhaust pipe 160 between the exhaust port 126 and the air blower 210. The end of the branch pipe 410 is open to the atmosphere. The on-off valve 412 is provided in the branch pipe 410.

In the second modified example, the air blowing controller 430 opens the on-off valve 412 at the time of stopping the engine E or at the start timing. The air blowing controller 430 closes the on-off valve 412 at the end timing.

The air blowing controller 430 may keep the throttle valve 142, the intake port 124, and the exhaust port 126 closed at the time of stopping the engine E.

As described above, the catalyst warming apparatus 400 can supply air (oxygen) to the purification catalyst 162 before the start of the engine E.

Third Modified Example

In the embodiment described above, the fuel feeder 220 controls the injector 150 to execute the post-injection at the time of stopping the engine E. The fuel feeder 220 may control the injector 150 to inject fuel at the start timing. In this case, the fuel feeder 220 may control the injector 150 to inject fuel after the air blowing controller 230 has started driving the air blower 210. Thus, the purification catalyst 162 can efficiently retain the fuel injected by the injector 150.

Although the exemplary embodiment of the disclosure has been described above with reference to the accompanying drawings, the embodiment of the disclosure is not limited to the embodiment described above. It is understood that a person having ordinary skill in the art may conceive various modifications or revisions within the scope of claims and those modifications or revisions also belong to the technical scope of the embodiment of the disclosure.

In the embodiment and the modified examples described above, the purification catalyst 162 is the three-way catalyst. In the purification catalyst 162, the content of the oxidation catalyst may be set larger than in the three-way catalyst. Thus, the oxidation reaction can further be advanced on the purification catalyst 162 before the start of the engine E and the purification catalyst 162 can be warmed with higher efficiency.

In the embodiment and the modified examples described above, the engine E is a gasoline engine. The engine E may be a diesel engine.

According to the embodiment of the disclosure, the purification catalyst can be warmed before the start of the engine.

The invention claimed is:

1. A catalyst warming apparatus comprising:
an air blower disposed between an engine and a purification catalyst in an exhaust pipe communicating with the engine and configured to blow air toward the purification catalyst;
a fuel injector configured to feed fuel into the engine or into the exhaust pipe between the air blower and the purification catalyst;
an intake port configured to switch between an open state and a closed state, the open state of the intake port allowing the intake port to supply air to the engine, the closed state of the intake port prohibiting the intake port to supply the air to the engine;
an exhaust port configured to switch between an open state and a closed state, the open state of the exhaust port allowing the exhaust port to discharge the air from the engine to the exhaust pipe, the closed state of the exhaust port prohibiting the exhaust port to discharge the air from the engine to exhaust pipe;
a fuel feeder configured to control the fuel injector to execute post-injection at a time of stopping the engine to discharge the fuel in an unburned state to cause the purification catalyst to retain the fuel in the unburned state; and
an air blowing controller configured to control the intake port and the exhaust port to be in the open state at the time of stopping the engine and to start driving the air blower at a predetermined start timing before a start of the engine so that the air blower blows the air to the purification catalyst retaining the fuel.

2. A catalyst warming apparatus, comprising:
an air blower disposed between an engine and a purification catalyst in an exhaust pipe communicating with the engine and configured to blow air toward the purification catalyst;
a branch pipe disposed on the exhaust pipe between the engine and the air blower, the branch pipe being configured to switch between an open state and a closed state, the open state of the branch pipe allowing the branch pipe to fluidly connect the exhaust pipe to ambient air outside the engine, the closed state of the branch pipe prohibiting the branch pipe to fluidly connect the exhaust pipe to the ambient air outside the engine;
a fuel injector configured to feed fuel into the engine or into the exhaust pipe between the air blower and the purification catalyst; and
circuitry configured to:
control the fuel injector to execute post-injection at a time of stopping the engine to discharge the fuel in an unburned state to cause the purification catalyst to retain the fuel in the unburned state;
control the branch pipe to be in the open state at the time or stopping the engine or at a predetermined start timing before a start of the engine; and
start driving the air blower at the predetermined start timing before the start of the engine to blow the air to purification catalyst retaining the fuel in the unburned state.

3. A catalyst warming apparatus comprising:
an air blower disposed between an engine and a purification catalyst in an exhaust pipe communicating with the engine and configured to blow air toward the purification catalyst;
a fuel injector configured to feed fuel into the engine or into the exhaust pipe between the air blower and the purification catalyst;
an intake port configured to switch between an open state and a closed state, the open state of the intake port allowing the intake port to supply air to the engine, the closed state of the intake port prohibiting the intake port to supply the air to the engine;
an exhaust port configured to switch between an open state and a closed state, the open state of the exhaust port allowing the exhaust port to discharge the air from the engine to the exhaust pipe, the closed state of the exhaust port prohibiting the exhaust port to discharge the air from the engine to exhaust pipe; and
a controller configured to:
at a predetermined start timing before a start of the engine, 1) start driving the air blower to blow the air to the purification catalyst and 2) in response to the air blower starts blowing the air to the purification catalyst, control the fuel injector to discharge the fuel in an unburned state to cause the purification catalyst to receive the fuel in the unburned state.

* * * * *